United States Patent
Huang

(10) Patent No.: US 10,568,045 B2
(45) Date of Patent: Feb. 18, 2020

(54) POWER CONTROL METHOD AND POWER CONTROL APPARATUS

(71) Applicant: Beijing Zhigu Rui Tuo Tech Co., Ltd., Beijing (CN)

(72) Inventor: Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 117 days.

(21) Appl. No.: 15/382,616

(22) Filed: Dec. 17, 2016

(65) Prior Publication Data

US 2017/0195974 A1    Jul. 6, 2017

(30) Foreign Application Priority Data

Dec. 31, 2015  (CN) .......................... 2015 1 1021467

(51) Int. Cl.
  *H04W 52/24*  (2009.01)
  *H04W 52/14*  (2009.01)
  *H04W 64/00*  (2009.01)

(52) U.S. Cl.
  CPC ....... *H04W 52/241* (2013.01); *H04W 52/146* (2013.01); *H04W 64/00* (2013.01)

(58) Field of Classification Search
  None
  See application file for complete search history.

(56) References Cited

U.S. PATENT DOCUMENTS

| 2008/0132184 | A1* | 6/2008 | Wan ..................... H04W 52/12 455/115.1 |
| 2009/0175245 | A1 | 7/2009 | Harada et al. |
| 2010/0002616 | A1* | 1/2010 | Peng .................. H04W 52/146 370/311 |
| 2010/0103867 | A1* | 4/2010 | Kishiyama ............ H04W 52/04 370/320 |
| 2010/0234058 | A1* | 9/2010 | Hu ..................... H04W 52/241 455/522 |

(Continued)

FOREIGN PATENT DOCUMENTS

| CN | 101449483 A | 6/2009 |
| CN | 101507324 A | 8/2009 |

(Continued)

*Primary Examiner* — Kibrom T Hailu
(74) *Attorney, Agent, or Firm* — Sheppard Mullin Richter & Hampton LLP

(57) ABSTRACT

Embodiments of this application disclose a power control method and a power control apparatus. The method comprises: receiving, during transmission of an uplink signal of a first time domain transmission length on a channel, at least one piece of first information transmitted on the channel, wherein the first time domain transmission length does not exceed a time domain transmission length of a protocol data unit PDU; and adjusting uplink transmit power during the first time domain transmission length at least according to the at least one piece of first information. By means of the method and the apparatus of the embodiments of this application, in a process of sending an uplink signal, a transmit end device can dynamically adjust transmit power of the uplink signal according to at least one piece of received first information transmitted on a same channel, thereby increasing adjustment granularity of the transmit power, and therefore power control is more precise.

24 Claims, 7 Drawing Sheets

(56) References Cited

U.S. PATENT DOCUMENTS

| | | | |
|---|---|---|---|
| 2013/0069828 A1* | 3/2013 | Cheng | H04W 74/0891 342/458 |
| 2015/0271767 A1* | 9/2015 | Lo | H04W 52/30 370/311 |

FOREIGN PATENT DOCUMENTS

| | | |
|---|---|---|
| CN | 101584132 A | 11/2009 |
| CN | 102098720 A | 6/2011 |
| CN | 102123450 A | 7/2011 |
| WO | 2015108873 A1 | 7/2015 |

\* cited by examiner

S234 — Adjust the preset interval at least according to a change in a relative location between the transmit end device and a receive end device
FIG. 2(e)
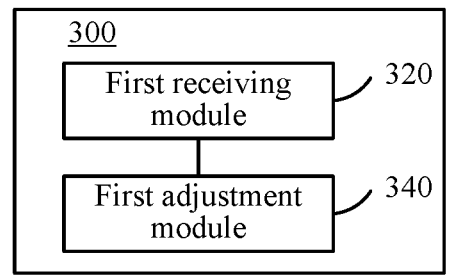
FIG. 3(a)
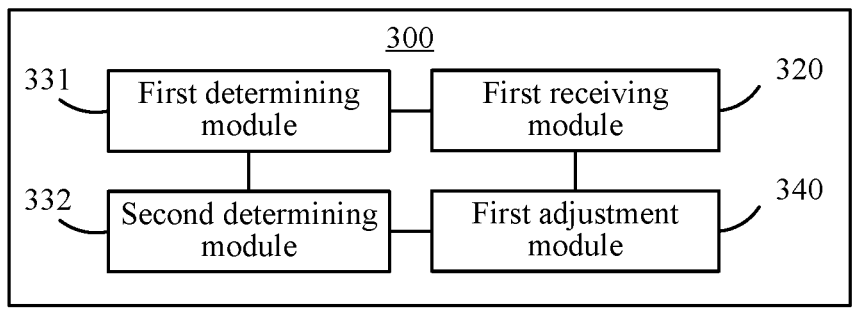
FIG. 3(b)

POWER CONTROL METHOD AND POWER CONTROL APPARATUS

CROSS REFERENCE TO RELATED APPLICATION

The present application is based on and claims the benefit of priority to Chinese Application No. 2015/11021467.5, filed on Dec. 31, 2015, the entire contents of which are incorporated herein by reference.

TECHNICAL FIELD

This application relates to the field of mobile communications technologies, and in particular, to a power control method and a power control apparatus.

BACKGROUND

In a mobile communications system, during transmission in a radio channel, a signal is affected by various factors that may cause signal fading, for example, a path loss. A main technical means for overcoming channel fading is power control: on the basis of evaluating of indexes of a receive end such as a received signal strength and/or a signal-to-noise ratio, transmit power of a transmit end is changed in time to compensate for the path loss and fading in the radio channel, thereby maintaining communication quality. Power control technologies comprise an open-loop power control technical solution, a closed-loop power control technical solution and an open-loop and closed-loop joint power control technical solution. In the open-loop power control technical solution, a transmit end measures a downlink reference signal from a target receive end in an idle timeslot, estimates a downlink path loss value with reference to transmit power of the downlink reference signal, and performs, when sending an uplink signal to the receive end, uplink path loss compensation according to a correlation between an uplink path and a downlink path and based on, for example, a downlink path loss value obtained at the last time, so as to determine transmit power. In the closed-loop power control technical solution, a receive end measures an uplink signal sent by a transmit end at the previous time, calculates a power adjustment value to obtain a power control command, and sends the power control command to the transmit end, and the transmit end adjusts current transmit power according to the power control command, thereby compensating for a channel quality change generated in the transmit end because of quick fading. In the open-loop and closed-loop joint power control technical solution, a transmit end sets transmit power with reference to transmit power obtained by means of open-loop power control and a power control command obtained by means of closed-loop power control.

In the foregoing open-loop power control solution, a path loss is generally calculated during an idle timeslot. During continuous signal transmission, transmit power is always determined according to a path loss calculated at the last time. For example, during an entire uplink timeslot or frame or subframe, uplink transmit power is the same. However, an actual path loss, affected by various factors such as an environment change, and an atmosphere condition, actually continuously changes with time. Consequently, signal power actually received by a receive end does not conform to expected receive power, or in other words, does not conform to an expected signal-to-noise ratio. Moreover, in the foregoing closed-loop power control solution, although the power control command is determined before the uplink signal is sent, the path loss that continuously changes with the time, an interference and the like cannot be rapidly used.

SUMMARY

In view of this, an objective of embodiments of this application is to provide a solution that can implement power control more precisely.

To achieve the foregoing objective, according to a first aspect of the embodiments of this application, a power control method is provided, wherein the method comprises:

receiving, during transmission of an uplink signal of a first time domain transmission length on a channel, at least one piece of first information transmitted on the channel, wherein the first time domain transmission length does not exceed a time domain transmission length of a protocol data unit PDU; and adjusting uplink transmit power during the first time domain transmission length at least according to the at least one piece of first information.

According to a second aspect of the embodiments of this application, an auxiliary power control method is provided, wherein the method comprises:

generating at least one piece of first information; and sending, when a transmit end device transmits an uplink signal of a first time domain transmission length on a channel, the at least one piece of first information on the channel, wherein the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU.

According to a third aspect of this application, a power control apparatus is provided, wherein the apparatus comprises:

a first receiving module, configured to receive, during transmission of an uplink signal of a first time domain transmission length on a channel, at least one piece of first information transmitted on the channel, wherein the first time domain transmission length does not exceed a time domain transmission length of a protocol data unit PDU; and a first adjustment module, configured to adjust uplink transmit power during the first time domain transmission length at least according to the at least one piece of first information.

According to a fourth aspect of this application, an auxiliary power control apparatus is provided, wherein the apparatus comprises:

a generation module, configured to generate at least one piece of first information; and a sending module, configured to send, when a transmit end device transmits an uplink signal of a first time domain transmission length on a channel, the at least one piece of first information on the channel, wherein the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU.

According to a fifth aspect of this application, a power control apparatus is provided, wherein the apparatus comprises:

a transceiver;
a memory, configured to store an instruction; and
a processor, configured to execute the instruction stored in the memory, wherein the instruction enables the processor to perform the following steps:

receiving, during transmission of an uplink signal of a first time domain transmission length on a channel, at least one piece of first information transmitted on the channel, wherein the first time domain transmission length does not exceed a time domain transmission length of a protocol data unit PDU; and adjusting uplink transmit power during the first time domain transmission length at least according to the at least one piece of first information.

According to a sixth aspect of this application, an auxiliary power control apparatus is provided, wherein the apparatus comprises:

a transceiver;
a memory, configured to store an instruction; and
a processor, configured to execute the instruction stored in the memory, wherein the instruction enables the processor to perform the following steps:

generating at least one piece of first information; and
sending, when a transmit end device transmits an uplink signal of a first time domain transmission length on a channel, the at least one piece of first information on the channel, wherein the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU.

By means of the method and the apparatus of the embodiments of this application, in a process of sending an uplink signal, a transmit end device can dynamically adjust transmit power of the uplink signal according to at least one piece of received first information transmitted on a same channel, thereby increasing adjustment granularity of the transmit power, and therefore power control is more precise.

BRIEF DESCRIPTION OF THE DRAWINGS

FIG. 2(e) depicts another operation S234 for adjusting a preset interval for communications, according to one embodiment of this application;

FIG. 3(a) to FIG. 3(f) are multiple exemplary structural block diagrams of a power control apparatus of an embodiment of this application;

DETAILED DESCRIPTION

Figure 1A:
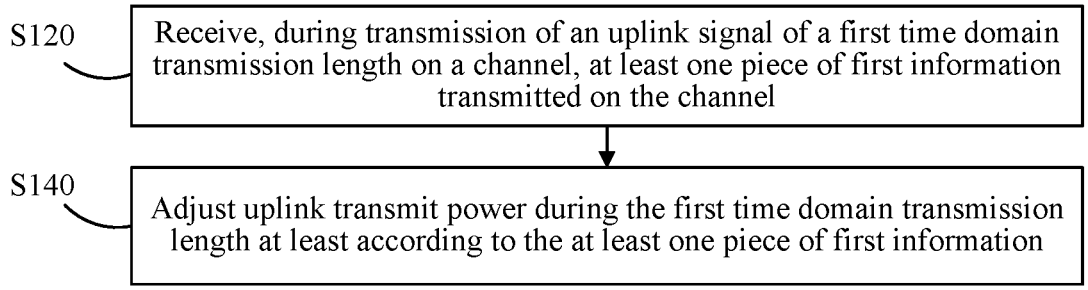
FIG. 1(a) is an exemplary flowchart of a power control method of an embodiment of this application.

The detailed description of the present invention is further described in detail hereinafter in connection with accompanying drawings and embodiments. The following embodiments are used to describe the present invention, but not used to limit the scope of the present invention.

It can be understood by a person skilled in the art that the terms such as "first" and "second" in this application are only used to differentiate different devices, modules or parameters, and the terms neither represent any specific technical meaning, nor represent an inevitable logic sequence between the steps, the devices, or the modules.

Solutions of embodiments of this application may be applied to various networks/systems, which comprise but are not limited to: a code division multiple access (CDMA) network, a time division multiple access (TDMA) network, a frequency division multiple access (FDMA) network, an orthogonal FDMA (OFDMA) network, and a single-carrier FDMA (SC-FDMA) network. Terms "system" and "network" generally may be used interchangeably. For purpose of clarity, in the following descriptions of the embodiments of this application, some aspects of technical solutions of this application are described mostly by using an LTE (Long Term Evolution) system as an example, and in most of the following descriptions, a technical term LTE-A is used, but this does not mean that the technical solutions of the embodiments of this application are limited to an LTE application scenario.

Moreover, in the embodiments of this application, a transmit end device and a receive end device are used to distinguish device roles in one continuous transmission process. A transmit end device in one continuous transmission process may also be a receive end device in another transmission process, or vice versa. Moreover, in the embodiments of this application, a term "uplink" means a communication direction from a transmit end device to a receive end device in one continuous transmission process. A term "downlink" means a communication direction from a receive end device to a transmit end device. Herein, one continuous transmission process means: a process of transmitting, in a system to which this application is applied, a minimum data transmission unit to which the system is applicable, the minimum data transmission unit is also referred to as a protocol data unit (PDU) in this text, and the protocol data unit may comprise but not limited to: a timeslot, a data frame, a packet, a data segment, a transport block of a length corresponding to a TTI (Transmission Time Interval), and the like.

Specifically, both the transmit end device and the receive end device may be an access point (AP) device, or may be an access terminal (AT) device. The access point device may comprise, be implemented as, or be referred to as a node B, an evolved node B (eNode B), a radio network controller (RNC), a base station controller (BSC), a base transceiver station (BTS), a base station (BS), a transceiver function (TF), a wireless router, a wireless transceiver, a basic service set (BSS), an extended service set (ESS), a radio base station (RBS), or another term. The access terminal device may comprise, be implemented as, or be referred to as an access terminal, a subscriber station, a subscriber unit, a mobile station, a remote station, a remote terminal, a subscriber terminal, a user agent, a user apparatus, user equipment, a subscriber station, or another term. The difference is that, to achieve the objective of the embodiments of this application, the transmit end device is at least a device that can operate in a Co-frequency Co-time Full Duplex (CCFD) operating mode. That is, the transmit end device has such a capability: while sending a signal on a channel, the transmit end device can receive a signal on the same channel. Herein, the channel (also referred to as a frequency channel) may be distinguished only by using a frequency, same channels mean channels whose frequencies are the same or in proximity, and the proximity means that a frequency offset does not exceed a frequency threshold.

FIG. 1(a) is an exemplary flowchart of a power control method of an embodiment of this application. The method is performed by a transmit end device. As shown in FIG. 1(a), the method comprises:

S120. Receive, during transmission of an uplink signal of a first time domain transmission length on a channel, at least one piece of first information transmitted on the channel, wherein the first time domain transmission length does not exceed a time domain transmission length of a protocol data unit PDU.

S140. Adjust uplink transmit power during the first time domain transmission length at least according to the at least one piece of first information.

The transmit end device may activate a full duplex operating mode according to a need. In this case, according to the method of this embodiment, when sending an uplink signal to a receive end device on a channel, the transmit end device can sense and receive at least one piece of first information transmitted on the same channel, and dynamically adjust transmit power of the uplink signal according to the at least one piece of first information. Specifically, the first time domain transmission length does not exceed a time domain transmission length of a PDU, and therefore during a PDU transmission process, the transmit end device can receive at least one piece of first information from the receive end device on the same channel, dynamically adjust, based on the at least one piece of first information, transmit power in a PDU transmission process, and then increase adjustment granularity of the transmit power, instead of always transmitting an uplink signal by using initial transmit power of the first time domain transmission length, and therefore power control is more precise. It should be noted that, the adjustment herein also comprises a special case in which an adjustment amplitude is 0, that is, adjustment does not need to be performed.

An example in which a PDU is a transport block corresponding to a subframe is used, a time domain transmission length of a PDU is a TTI of 1 ms, and a first time domain transmission length=1 ms. According to the method of this embodiment, user equipment determines, based on a path loss calculated at the last time, initial transmit power and transmits an uplink signal in a subframe. During transmission in the subframe, the user equipment receives, on a same channel, one or more downlink reference signals sent by a base station, and may measure each received downlink reference signal, estimate a path loss of a downlink channel with reference to transmit power of each downlink reference signal, perform uplink path loss compensation based on a downlink path loss value, and implement at least multiple times of adjustment on uplink transmit power in the subframe.

In the method of this embodiment, the first information may be a reference signal sent by the receive end device (in a case of open-loop power control), or may be a control command sent by the receive end device and associated with the adjusting the uplink transmit power (in a case of closed-loop power control). Moreover, during the first time domain transmission length, the transmit end device may receive multiple pieces of first information, and the multiple pieces of first information may all be reference signals, or may all be control commands, or not only comprise reference signals, but also comprise control commands. In an implementation manner in which the at least one piece of first information comprises the reference signal sent by the receive end device, the reference signal is unnecessarily transmitted by the receive end device specially in order that the transmit end device adjusts transmit power, and is also unnecessarily transmitted by the receive end device specially on the same channel on which the transmit end device sends an uplink signal, but is received on the same channel on which the transmit end device can send an uplink signal to the receive end device, and may be used as a basis of adjusting transmit power. In a possible implementation manner, the reference signal may be a cell-specific reference signal CRS, a UE-specific reference signal (UE-specific RS), or the like sent by a base station, for example, sent by the base station in a broadcast manner. In another possible implementation manner, the reference signal may be, for example, a pilot signal, a sounding reference signal SRS, or the like sent by user equipment. The control command associated with the adjusting the uplink transmit power may be any form that can instruct the transmit end device to adjust transmit power, which comprises but not limited to: a specific power value, a transmit power adjustment trend (increase or reduction), a transmit power adjustment amplitude (how much is increased or how much is reduced), a transmit power adjustment frequency (for example, an amplitude is increased or reduced each time a reference signal is received), or the like.

Figure 1B:
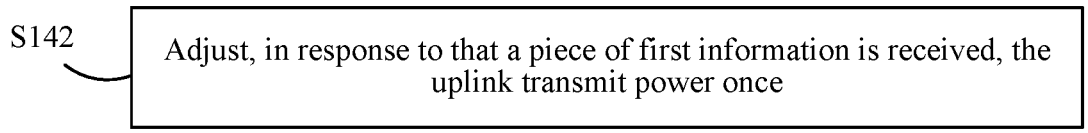
FIG. 1(b) depicts an operation S142 included in step S140 of FIG. 1(a), according to one embodiment of this application.

Moreover, each piece of first information corresponds to a possible channel condition, and channel conditions corresponding to all pieces of first information may be the same or different. In a possible implementation manner, in the method of this embodiment, transmit power adjustment may be implemented based on each piece of received first information, so as to adapt to various channel conditions. In such implementation manner, step S140 may comprise (with reference to FIG. 1(b)):

S142. Adjust, in response to that a piece of first information is received, the uplink transmit power once. In other words, each time a piece of first information is received, transmit power adjustment is implemented once.

Figure 1C:
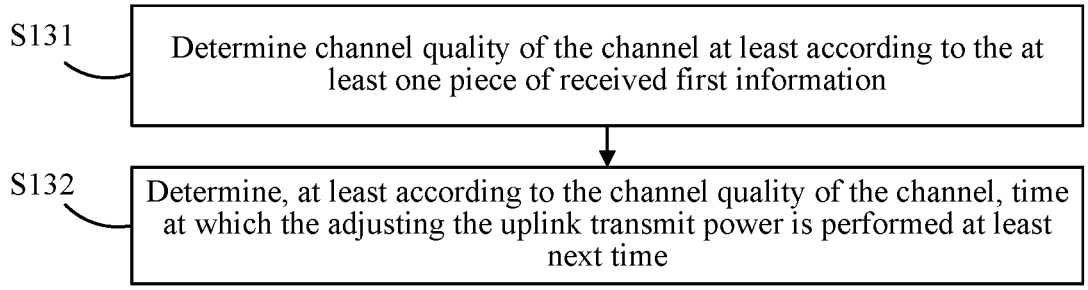
FIG. 1(c) is a flowchart illustrating further operations of the method shown in FIG. 1(a), according to embodiments of this application.

However, although each piece of first information corresponds to a possible channel condition, channel conditions corresponding to first information received at different times may be the same as or have small changes, which indicates that a channel change extent is not so violent. In such case, transmit power does not need to be frequently adjusted. If a corresponding channel is always being sensed, or, each time a piece of first information is received, measurement is implemented once or power adjustment is implemented once, relatively large power is undoubtedly consumed. Therefore, in consideration of such case, in the method of this embodiment, transmit power adjustment may be specifically implemented based on at least one piece of received first information. Specifically:

In a possible implementation manner, the method of this embodiment may further comprise (with reference to FIG. 1(c)):

S131. Determine channel quality of the channel at least according to the at least one piece of received first information.

S132. Determine, at least according to the channel quality of the channel, time at which the adjusting the uplink transmit power is performed at least next time.

In such implementation manner, the time is not limited to a specific time point, but indicates a time interval after which transmit power adjustment is performed next time, a frequency at which multiple times of subsequent adjustment are performed, or the like. For example, the transmit end device does not implement transmit power adjustment once each time a piece of first information is received. Instead, to save power consumption, the transmit end device performs transmit power adjustment at, for example, a first frequency. According to the method of this embodiment, the first frequency may be set according to the received first information, thereby adjusting uplink transmit power according to a need of a channel quality change situation. For example, a downlink path loss is calculated according to measured power (that is, receive power) of a received reference signal and transmit power of the reference signal, and the downlink path loss is compared with a path loss measured historically (for example, previous time). If the two path losses change relatively largely, it means that a channel change extent is violent, and a frequency at which transmit power adjustment is implemented may be changed: if the path loss increases by more than a threshold, the frequency at which power adjustment is implemented is improved; otherwise, the frequency at which power adjustment is implemented is reduced. If a difference between the two path losses does not exceed the threshold, the frequency at which transmit power adjustment is implemented does not need to be changed.

In such implementation manner, the adjustment in step S140 is implemented according to the time determined in step S132.

Figure 1D:
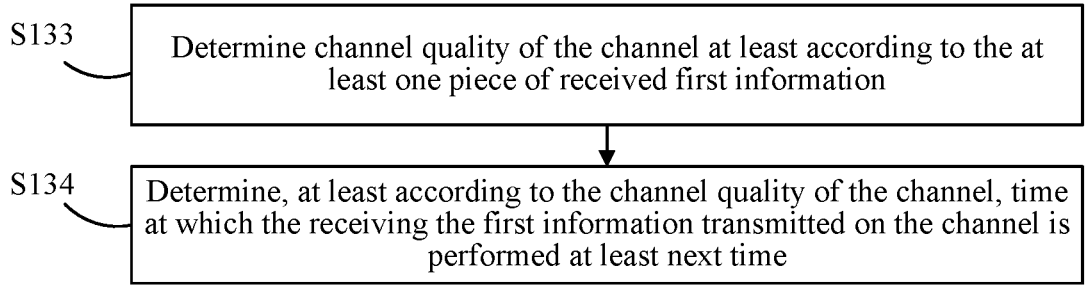
FIG. 1(d) is a flowchart illustrating further operations of the method shown in FIG. 1(a), according to embodiments of this application.

In another possible implementation manner, the method of this embodiment may further comprise (with reference to FIG. 1(d)):

S133. Determine channel quality of the channel at least according to the at least one piece of received first information.

S134. Determine, at least according to the channel quality of the channel, time at which the receiving the first information transmitted on the channel is performed at least next time.

That is, the transmit end device does not need to always sense the first information on a sending channel of the uplink signal, but implements sensing and receiving at a frequency, thereby saving some power consumption. Similarly, the time in step S134 is not limited to a specific time point either, but indicates a time interval after which first information is received next time, a frequency at which multiple times of subsequent reception are performed, or the like. For example, the transmit end device may receive first information at a second frequency, that is, sense a corresponding channel for a period of time after a time interval and implement reception, and the second frequency may be adjusted with a change violence extent of channel quality. For example, a downlink path loss is calculated according to measured power (that is, receive power) of a received reference signal and transmit power of the reference signal, and the downlink path loss is compared with a path loss measured historically (for example, previous time). If a difference between the two path losses is relatively largely, it means that a channel change extent is violent, and a frequency at which the reference signal is received may be adjusted: the path loss increases relatively largely, the frequency at which the first information is received is improved; otherwise, the frequency at which the first information is received is reduced. If the difference between the two path losses is not large, the frequency at which reception is implemented does not need to be adjusted.

Moreover, a change in a relative location between the transmit end device and the receive end device also causes the channel to change, that is, corresponds to different channel quality in which a relatively large change may occur. A change in a motion state of the transmit end device and/or the receive end device causes the relative location to change. Therefore, in another possible implementation manner, the change in the relative location between the transmit end device and the receive end device of the channel may be determined or predicted according to the motion state of the transmit end device and/or the receive end device, and herein, the motion state comprises a current motion speed and/or a predicted motion trend, or the like of the transmit end device and/or the receive end device. In the method of this embodiment, the motion state of the transmit end device and/or the receive end device is information that the transmit end device can acquire. For example, the transmit end device communications with the receive end device to acquire the motion state of the receive end device, and the transmit end device can measure the motion state of the transmit end device, and the like. In a possible implementation manner, if both the transmit end device and the receive end device keep motionless in a period of time, it may be considered that the channel condition between the two does not change. Therefore, the uplink transmit power does not need to be frequently adjusted, or the first information does not need to be frequently received. If the relative location between the transmit end device and the receive end device changes relatively largely because of rapid motion of the transmit end device and/or the receive end device, the uplink transmit power may be relatively frequently adjusted, or the first information may be relatively frequently received.

Figure 1E:
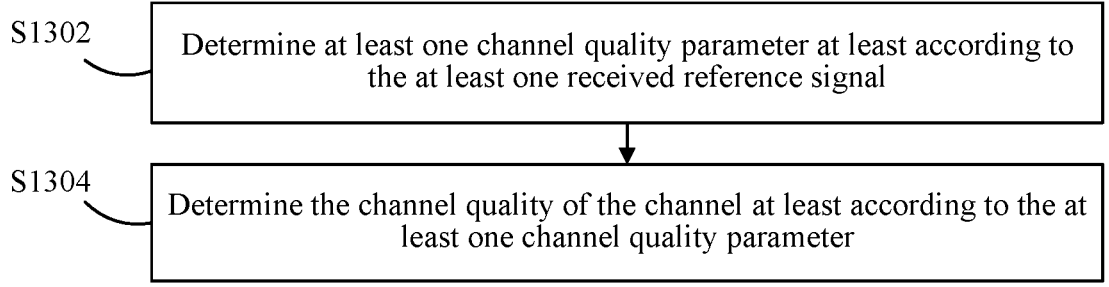
FIG. 1(e) is a flowchart illustrating further operations of steps S131 and S133 of FIGS. 1(c) and 1(d), according to one embodiment of this application.

Moreover, the channel quality may be measured by using at least one channel quality parameter, and in the method of this embodiment, step S131 and step S133 may further comprise (with reference to FIG. 1(e)):

S1302. Determine at least one channel quality parameter at least according to the at least one received reference signal.

S1304. Determine the channel quality of the channel at least according to the at least one channel quality parameter.

The foregoing channel quality parameter may be a parameter associated with one or more parameters that may be used to measure channel quality, for example, a path loss, a signal-to-noise ratio SNR, a carrier-to-noise ratio CNR, a signal-to-interference-plus-noise ratio SINR, a carrier-tointerference-plus-noise ratio CINR, a bit error rate BER, channel attenuation, a time delay, channel state information CSI, a channel transmission matrix and a channel quality indicator CQI. Moreover, channel quality may be determined by using any one or more appropriate channel quality parameters, which is not used herein as a limitation to the method of this embodiment.

It should be noted that, the transmit power in the method of this embodiment may mean transmit power on a particular channel of the transmit end device, or may mean a sum of transmit power of multiple channels.

To sum up, in the method of this embodiment, precise power control can be implemented by means of relatively low power consumption.

Figure 2A:
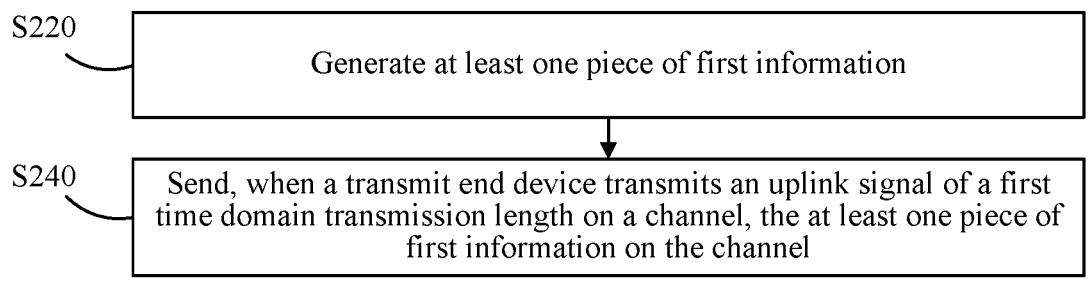
FIG. 2(a) is an exemplary flowchart of an auxiliary power control method of an embodiment of this application.

FIG. 2(a) is an exemplary flowchart of an auxiliary power control method of an embodiment of this application. The method is performed by a receive end device. As shown in FIG. 2(a), the method may comprise:

S220. Generate at least one piece of first information.

S240. Send, when a transmit end device transmits an uplink signal of a first time domain transmission length on a channel, the at least one piece of first information on the channel.

As described with reference to FIG. 1(a), the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU. Specifically, the first time domain transmission length does not exceed a time domain transmission length of a PDU, and therefore during a PDU transmission process, the transmit end device can receive at least one piece of first information from the receive end device on the same channel, dynamically adjust, based on the at least one piece of first information, transmit power in a PDU transmission process, and then increase adjustment granularity of the transmit power, instead of always transmitting an uplink signal by using initial transmit power of the first time domain transmission length, and therefore power control is more precise. It should be noted that, the adjustment herein also comprises a special case in which an adjustment amplitude is 0, that is, adjustment does not need to be performed.

Figure 2B:
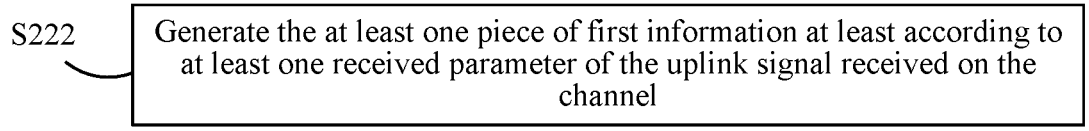
FIG. 2(b) depicts an operation S222 included in step S220 of FIG. 2(a), according to one embodiment of this application.

In the method of this embodiment, the first information may be a reference signal sent by the receive end device (in a case of open-loop power control), or may be a control command sent by the receive end device and associated with the adjusting the uplink transmit power (in a case of closed-loop power control). Moreover, during the first time domain transmission length, multiple pieces of first information may be sent, and the multiple pieces of first information may all be reference signals, or may all be control commands, or not only comprise reference signals, but also comprise control commands. In an implementation manner in which the at least one piece of first information comprises a reference signal, the reference signal is unnecessarily transmitted specially in order that the transmit end device adjusts transmit power, and is also unnecessarily transmitted specially on the same channel on which the transmit end device sends an uplink signal, but should be received on the same channel on which the transmit end device can send an uplink signal to the receive end device, and may be used as a basis of adjusting transmit power. In a possible implementation manner, the receive end device may be a base station, the reference signal may be, for example, a cell-specific reference signal CRS or a UE-specific reference signal (UE-specific RS) sent by the base station in a broadcast manner, and in step S220, such reference signal may be generated in any appropriate manner in the art. In another possible implementation manner, the receive end device may be user equipment, and in this case, the reference signal may be, for example, a pilot signal or a sounding reference signal SRS. The control command associated with the adjusting the uplink transmit power may be any form that can instruct the transmit end device to adjust transmit power, which comprises but not limited to: a specific power value, a transmit power adjustment trend (increase or reduction), a transmit power adjustment amplitude (how much is increased or how much is reduced), a transmit power adjustment frequency (for example, an amplitude is increased or reduced each time a reference signal is received), or the like. In such case, in step S220, a control command, that is, the first information, associated with the adjusting the transmit power may be generated according to measurement on a signal from the transmit end device (for example, measurement on a received signal-to-noise ratio) and an expected signal-to-noise ratio. In other words, step S220 may further comprise:

S222 (with reference to FIG. 2(b)). Generate the at least one piece of first information at least according to at least one received parameter of the uplink signal received on the channel.

The at least one received parameter may comprise received signal power, a received signal-to-noise ratio, and any parameter that can indicate channel quality.

Figure 2C:
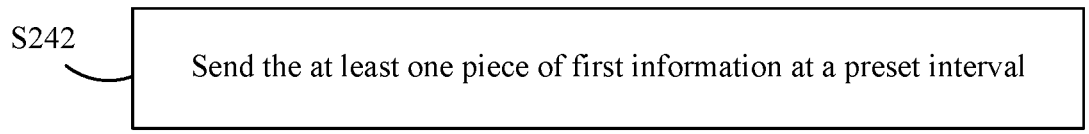
FIG. 2(c) depicts an operation S242 included in step S240 of FIG. 2(a), according to one embodiment of this application.

Still as described with reference to FIG. 1(a) (a, each piece of first information may correspond to a possible channel condition, channel conditions corresponding to all pieces of first information may be the same or be not quite different or be quite different, and when the channel conditions do not change so violently, the transmit end device does not need to adjust the transmit power. In order that the transmit end device can implement transmit power control more precisely, in a possible implementation manner, in the method of this embodiment, the first information may be sent at an interval in response to a change violence extent of the channel conditions. In such implementation manner, step S240 may further comprise:

S242 (with reference to FIG. 2(c)). Send the at least one piece of first information at a preset interval.

The preset interval may be set based on the change violence extent of the channel conditions. For example, when a violent channel condition change occurs relatively frequently, the preset interval is set to be relatively small; otherwise, the preset interval is set to be relatively large. Specific setting may be based on a requirement on signal transmission quality or the like, which is not used herein as a limitation to this technical solution.

Figure 2D:
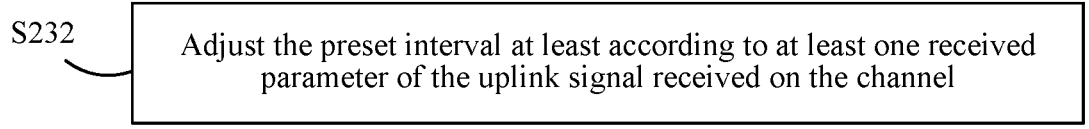
FIG. 2(d) depicts an operation S232 for adjusting a preset interval for communications, according to one embodiment of this application.

In a possible implementation manner, a channel condition change extent may be determined by using a signal from the transmit end device. In such implementation manner, the method of this embodiment further comprises:

S232 (with reference to FIG. 2(d)). Adjust the preset interval at least according to at least one received parameter of the uplink signal received on the channel.

For example, a received signal-to-noise ratio of the uplink signal is obtained according to measurement on the received uplink signal, and compared with a signal-to-noise ratio obtained by means of historical (for example, previous) measurement. If the signal-to-noise ratio is reduced by more than a threshold, it means that the channel condition severely deteriorates, and the preset interval may be reduced; otherwise, the preset interval may not be adjusted or increased.

Still as described with reference to FIG. 1(a), a change in a relative location between the transmit end device and the receive end device also causes the channel to change, that is, corresponds to different channel quality in which a relatively large change may occur. Therefore, in another possible implementation manner, the preset interval may be adjusted based on a change in a relative location between the transmit end device and a receive end device. In such implementation manner, the method of this embodiment further comprises:

S234 (with reference to FIG. 2(e)). Adjust the preset interval at least according to a change in a relative location between the transmit end device and a receive end device.

The change in the relative location between the transmit end device and the receive end device also causes the channel to change, that is, corresponds to different channel quality in which a relatively large change may occur. A change in a motion state of the transmit end device and/or the receive end device causes the relative location to change. Therefore, it may be determined or predicted, according to the motion state of the transmit end device and/or the receive end device, that a channel change frequently occurs, and the preset interval may be set to be relatively small; otherwise, the preset interval may not be adjusted or the preset interval may be set to be relatively large. Herein, the motion state comprises a current motion speed and/or a predicted motion trend, or the like of the transmit end device and/or the receive end device. In the method of this embodiment, the motion state of the transmit end device and/or the receive end device is information that the receive end device can acquire. For example, the receive end device communications with the transmit end device to acquire the motion state of the transmit end device, and the receive end device can measure the motion state of the receive end device, and the like.

To sum up, the method of this embodiment helps the transmit end device implement precise power control, and helps the transmit end device save power consumption.

Persons skilled in the art can understand that, in the foregoing methods of the specific implementation manners of this application, the value of the sequence number of each step does not indicate an execution order, and the execution order of the steps should be determined according to a function and an inherent logic thereof, and should not form any limit to the implementation process of the specific implementation manners of this application.

Moreover, an embodiment of this application further provides a computer readable medium, comprising a computer readable instruction for performing, when being executed, the following operations: operations of performing steps of the method in the implementation manner shown in FIG. 1(a).

Moreover, an embodiment of this application further provides a computer readable medium, comprising a computer readable instruction for performing the following operations when being executed: operations of performing the steps of the method in the implementation manner shown in FIG. 2(a).

FIG. 3(a) is an exemplary structural block diagram of a power control apparatus of an embodiment of this application. The apparatus may belong to a transmit end device or the apparatus is a transmit end device. As shown in FIG. 3(a), the apparatus 300 comprises:

a first receiving module 320, configured to receive, during transmission of an uplink signal of a first time domain transmission length on a channel, at least one piece of first information transmitted on the channel, wherein the first time domain transmission length does not exceed a time domain transmission length of a protocol data unit PDU; and a first adjustment module 340, configured to adjust uplink transmit power during the first time domain transmission length at least according to the at least one piece of first information.

The transmit end device may activate a full duplex operating mode according to a need. In this case, according to the apparatus of this embodiment, when sending an uplink signal to a receive end device on a channel, the transmit end device can sense and receive, by using the first receiving module 320, at least one piece of first information transmitted on the same channel, and the first adjustment module 340 dynamically adjusts transmit power of the uplink signal according to the at least one piece of first information. Specifically, the first time domain transmission length does not exceed a time domain transmission length of a PDU, and therefore during a PDU transmission process, the transmit end device can receive at least one piece of first information from the receive end device on the same channel, dynamically adjust, based on the at least one piece of first information, transmit power in a PDU transmission process, and then increase adjustment granularity of the transmit power, instead of always transmitting an uplink signal by using initial transmit power of the first time domain transmission length, and therefore power control is more precise. It should be noted that, the adjustment herein also comprises a special case in which an adjustment amplitude is 0, that is, adjustment does not need to be performed.

An example in which a PDU is a transport block corresponding to a subframe is used, a time domain transmission length of a PDU is a TTI of 1 ms, and a first time domain transmission length=1 ms. According to the apparatus of this embodiment, user equipment determines, based on a path loss calculated at the last time, initial transmit power and transmits an uplink signal in a subframe. During transmission in the subframe, the user equipment receives, on a same channel, one or more downlink reference signals sent by a base station, and may measure each received downlink reference signal, estimate a path loss of a downlink channel with reference to transmit power of each downlink reference signal, perform uplink path loss compensation based on a downlink path loss value, and implement at least multiple times of adjustment on uplink transmit power in the subframe.

In the apparatus of this embodiment, the first information may be a reference signal sent by the receive end device (in a case of open-loop power control), or may be a control command sent by the receive end device and associated with the adjusting the uplink transmit power (in a case of closed-loop power control). Moreover, during the first time domain transmission length, the transmit end device may receive multiple pieces of first information, and the multiple pieces of first information may all be reference signals, or may all be control commands, or not only comprise reference signals, but also comprise control commands. In an implementation manner in which the at least one piece of first information comprises the reference signal sent by the receive end device, the reference signal is unnecessarily transmitted by the receive end device specially in order that the transmit end device adjusts transmit power, and is also unnecessarily transmitted by the receive end device specially on the same channel on which the transmit end device sends an uplink signal, but is received on the same channel on which the transmit end device can send an uplink signal to the receive end device, and may be used as a basis of adjusting transmit power. In a possible implementation manner, the reference signal may be a cell-specific reference signal CRS, a UE-specific reference signal (UE-specific RS), or the like sent by a base station, for example, sent by the base station in a broadcast manner. In another possible implementation manner, the reference signal may be, for example, a pilot signal, a sounding reference signal SRS, or the like sent by user equipment. The control command associated with the adjusting the uplink transmit power may be any form that can instruct the transmit end device to adjust transmit power, which comprises but not limited to: a specific power value, a transmit power adjustment trend (increase or reduction), a transmit power adjustment amplitude (how much is increased or how much is reduced), a transmit power adjustment frequency (for example, an amplitude is increased or reduced each time a reference signal is received), or the like.

Moreover, each piece of first information corresponds to a possible channel condition, and channel conditions corresponding to all pieces of first information may be the same or different. In a possible implementation manner, the apparatus of this embodiment may implement transmit power adjustment based on each piece of received first information, so as to adapt to various channel conditions. In such implementation manner, the first adjustment module 340 may be configured to adjust, in response to that a piece of first information is received, the uplink transmit power once. In other words, each time a piece of first information is received, transmit power adjustment is implemented once.

However, although each piece of first information corresponds to a possible channel condition, channel conditions corresponding to first information received at different times may be the same as or have small changes, which indicates that a channel change extent is not so violent. In such case, transmit power does not need to be frequently adjusted. If a corresponding channel is always being sensed, or, each time a piece of first information is received, measurement is implemented once or power adjustment is implemented once, relatively large power is undoubtedly consumed. Therefore, in consideration of such case, the apparatus of this embodiment may specifically implement transmit power adjustment based on at least one piece of received first information. Specifically:

In a possible implementation manner, as shown in FIG. 3(b), the apparatus 300 of this embodiment may further comprise:

a first determining module 331, configured to determine channel quality of the channel at least according to the at least one piece of received first information; and a second determining module 332, configured to determine, at least according to the channel quality of the channel, time at which the adjusting the uplink transmit power is performed at least next time.

In such implementation manner, the time is not limited to a specific time point, but indicates a time interval after which the first adjustment module 340 performs transmit power adjustment next time, a frequency at which multiple times of subsequent adjustment are performed, or the like. For example, the first adjustment module 340 does not implement transmit power adjustment once each time the first receiving module 320 receives a piece of first information. Instead, to save power consumption, the first adjustment module 340 performs transmit power adjustment at, for example, a first frequency. The first frequency may be set according to the first information received by the first receiving module 320, thereby adjusting uplink transmit power according to a need of a channel quality change situation. For example, a downlink path loss is calculated according to measured power (that is, receive power) of a reference signal received by the first receiving module 320 and transmit power of the reference signal, and the downlink path loss is compared with a path loss measured historically (for example, previous time). If the two path losses change relatively largely, it means that a channel change extent is violent, and a frequency at which the first adjustment module 340 implements transmit power adjustment may be changed: if the path loss increases by more than a threshold, the frequency at which power adjustment is implemented is improved; otherwise, the frequency at which power adjustment is implemented is reduced. If a difference between the two path losses does not exceed the threshold, the frequency at which transmit power adjustment is implemented does not need to be changed.

In such implementation manner, the first adjustment module 340 implements adjustment according to the time determined by the second determining module 332.

Figure 3C:
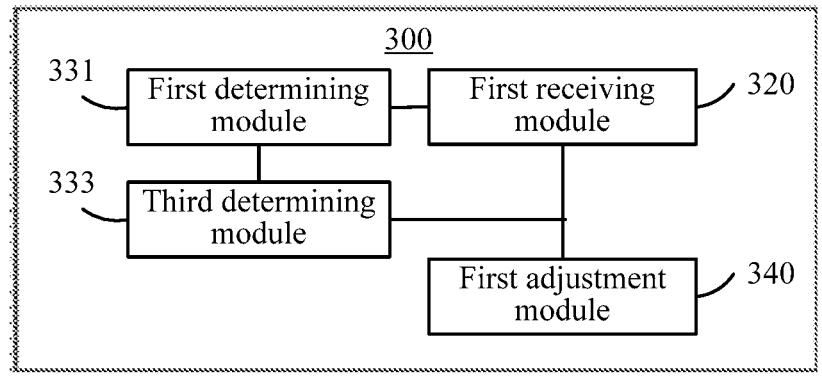

In another possible implementation manner, different from FIG. 3(b), in addition to the first determining module 331 shown in FIG. 3(b), as shown in FIG. 3(c), the apparatus 300 of this embodiment may further comprise:

a third determining module 333, configured to determine, at least according to the channel quality of the channel, time at which the receiving the first information transmitted on the channel is performed at least next time.

That is, the first receiving module 320 does not need to always sense the first information on a sending channel of the uplink signal, but implements sensing and receiving at a frequency, thereby saving some power consumption. Similarly, the time is not limited to a specific time point either, but indicates a time interval after which first information is received next time, a frequency at which multiple times of subsequent reception are performed, or the like. For example, the first receiving module 320 may receive first information at a second frequency, that is, sense a corresponding channel for a period of time after a time interval and implement reception, and the second frequency may be adjusted with a change violence extent of channel quality. For example, a downlink path loss is calculated according to measured power (that is, receive power) of a reference signal received by the first receiving module 320 and transmit power of the reference signal, and the downlink path loss is compared with a path loss measured historically (for example, previous time). If a difference between the two path losses is relatively largely, it means that a channel change extent is violent, and a frequency at which the reference signal is received may be adjusted: the path loss increases relatively largely, the frequency at which the first information is received is improved; otherwise, the frequency at which the first information is received is reduced. If the difference between the two path losses is not large, the frequency at which reception is implemented does not need to be adjusted.

Figure 3D:
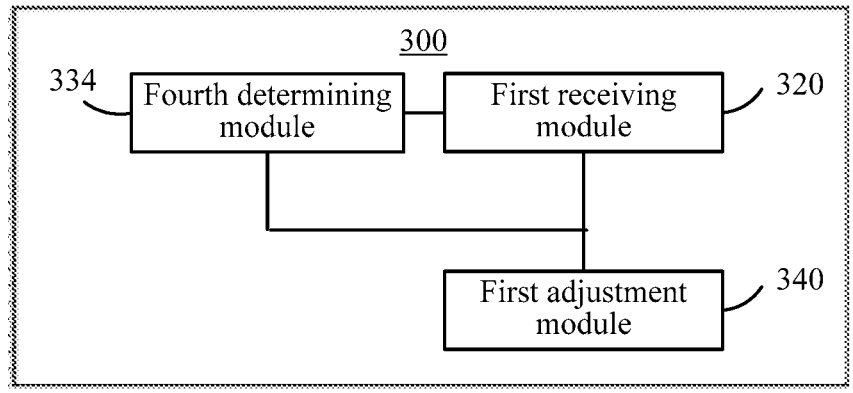
Figure 3E:
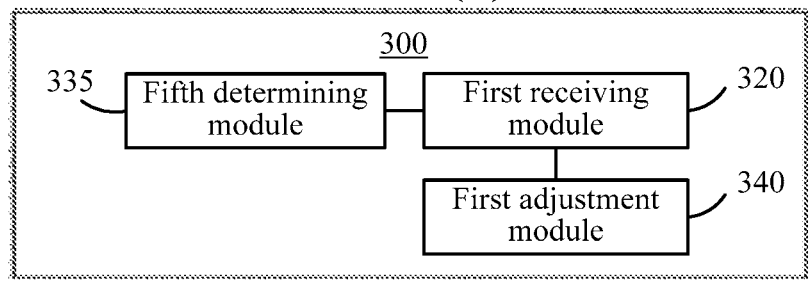

Moreover, a change in a relative location between the transmit end device and the receive end device also causes the channel to change, that is, corresponds to different channel quality in which a relatively large change may occur. In a possible implementation manner, as shown in FIG. 3(d), the apparatus 300 of this embodiment may further comprise: a fourth determining module 334, configured to determine, at least according to a change in a relative location between a transmit end device and a receive end device, time at which the first adjustment module performs the adjusting the uplink transmit power at least next time. In another possible manner, as shown in FIG. 3(e), the apparatus 300 of this embodiment further comprises: a fifth determining module 335, configured to determine, at least according to a change in a relative location between a transmit end device and a receive end device, time at which the first receiving module performs the receiving the first information transmitted on the channel at least next time. A change in a motion state of the transmit end device and/or the receive end device causes the relative location to change. Therefore, both the fourth determining module 334 and the fifth determining module 335 may determine or predict the change in the relative location between the transmit end device and the receive end device according to the motion state of the transmit end device and/or the receive end device, and herein, the motion state comprises a current motion speed and/or a predicted motion trend, or the like of the transmit end device and/or the receive end device. In the apparatus of this embodiment, the motion state of the transmit end device and/or the receive end device is information that the transmit end device can acquire. For example, the transmit end device communications with the receive end device to acquire the motion state of the receive end device, and measures the motion state of the transmit end device, and the like. In a possible implementation manner, if both the transmit end device and the receive end device keep motionless in a period of time, it may be considered that the channel condition between the two does not change. Therefore, the uplink transmit power does not need to be frequently adjusted, or the first information does not need to be frequently received. If the relative location between the transmit end device and the receive end device changes relatively largely because of rapid motion of the transmit end device and/or the receive end device, the first adjustment module 340 may relatively frequently adjust the uplink transmit power, or the first receiving module 320 may relatively frequently receive the first information.

Figure 3F:
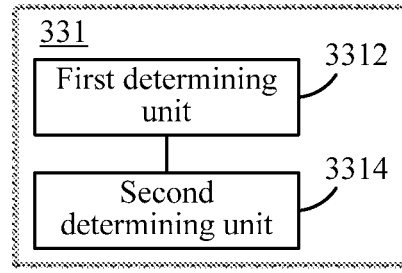

Moreover, the channel quality may be measured by using at least one channel quality parameter, and in the apparatus of this embodiment, as shown in FIG. 3(f), the first determining module 331 may further comprise:

a first determining unit 3312, configured to determine at least one channel quality parameter at least according to the at least one piece of received reference signal; and a second determining unit 3314, configured to determine the channel quality of the channel at least according to the at least one channel quality parameter.

The foregoing channel quality parameter may be a parameter associated with one or more parameters that may be used to measure channel quality, for example, a path loss, a signal-to-noise ratio SNR, a carrier-to-noise ratio CNR, a signal-to-interference-plus-noise ratio SINR, a carrier-to-interference-plus-noise ratio CINR, a bit error rate BER, channel attenuation, a time delay, channel state information CSI, a channel transmission matrix and a channel quality indicator CQI. Moreover, the second determining unit 3314 may determine channel quality by using any one or more appropriate channel quality parameters, which is not used herein as a limitation to the apparatus of this embodiment.

It should be noted that, the transmit power in the apparatus of this embodiment may mean transmit power on a particular channel of the transmit end device, or may mean a sum of transmit power of multiple channels.

To sum up, the apparatus of this embodiment enables the transmit end device to implement precise power control by means of relatively low power consumption.

Figure 4A:
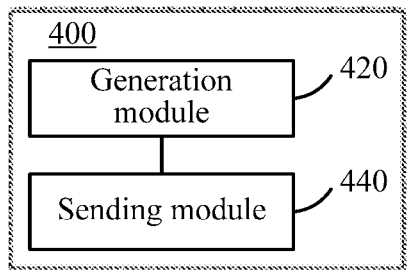
FIG. 4(a) to FIG. 4(c) are multiple exemplary structural block diagrams of an auxiliary power control apparatus of an embodiment of this application.

FIG. 4(a) is an exemplary structural block diagram of an auxiliary power adjustment apparatus of an embodiment of this application. The apparatus may belong to or be a receive end device. As shown in FIG. 4(a), the apparatus 400 may comprise:

a generation module 420, configured to generate at least one piece of first information; and a sending module 440, configured to send, when a transmit end device transmits an uplink signal of a first time domain transmission length on a channel, the at least one piece of first information on the channel.

As described with reference to FIG. 3(a) to FIG. 3(f), the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU. Specifically, the first time domain transmission length does not exceed a time domain transmission length of a PDU, and therefore during a PDU transmission process, the transmit end device can receive at least one piece of first information from the receive end device on the same channel, dynamically adjust, based on the at least one piece of first information, transmit power in a PDU transmission process, and then increase adjustment granularity of the transmit power, instead of always transmitting an uplink signal by using initial transmit power of the first time domain transmission length, and therefore power control is more precise. It should be noted that, the adjustment herein also comprises a special case in which an adjustment amplitude is 0, that is, adjustment does not need to be performed.

In the apparatus of this embodiment, the first information may be a reference signal sent by the receive end device (in a case of open-loop power control), or may be a control command sent by the receive end device and associated with the adjusting the uplink transmit power (in a case of closed-loop power control). Moreover, during the first time domain transmission length, multiple pieces of first information may be sent, and the multiple pieces of first information may all be reference signals, or may all be control commands, or not only comprise reference signals, but also comprise control commands. In an implementation manner in which the at least one piece of first information comprises a reference signal, the reference signal is unnecessarily transmitted specially in order that the transmit end device adjusts transmit power, and is also unnecessarily transmitted specially on the same channel on which the transmit end device sends an uplink signal, but should be received on the same channel on which the transmit end device can send an uplink signal to the receive end device, and may be used as a basis of adjusting transmit power. In a possible implementation manner, the apparatus of this embodiment may be a base station, the reference signal may be, for example, a cell-specific reference signal CRS or a UE-specific reference signal (UE-specific RS) sent in a broadcast manner, and the generation module 420 may generate such reference signal in any appropriate manner in the art. In another possible implementation manner, the apparatus of this embodiment may be user equipment, and in this case, the reference signal may be, for example, a pilot signal or a sounding reference signal SRS. The control command associated with the adjusting the uplink transmit power may be any form that can instruct the transmit end device to adjust transmit power, which comprises but not limited to: a specific power value, a transmit power adjustment trend (increase or reduction), a transmit power adjustment amplitude (how much is increased or how much is reduced), a transmit power adjustment frequency (for example, an amplitude is increased or reduced each time a reference signal is received), or the like. In such case, in step S220, a control command, that is, the first information, associated with the adjusting the transmit power may be generated according to measurement on a signal from the transmit end device (for example, measurement on a received signal-to-noise ratio) and an expected signal-to-noise ratio. In other words, the generation module 420 may be configured to generate the at least one piece of first information at least according to at least one received parameter of the uplink signal received on the channel.

The at least one received parameter may comprise received signal power, a received signal-to-noise ratio, and any parameter that can indicate channel quality.

Still as described with reference to FIG. 3(*a*) to FIG. 3(*f*), each piece of first information may correspond to a possible channel condition, channel conditions corresponding to all pieces of first information may be the same or be not quite different or be quite different, and when the channel conditions do not change so violently, the transmit end device does not need to adjust the transmit power. In order that the transmit end device can implement transmit power control more precisely, in a possible implementation manner, the apparatus of this embodiment may send the first information at an interval in response to a change violence extent of the channel conditions. That is, the sending module 440 may be configured to send the at least one piece of first information at a preset interval.

The preset interval may be set based on the change violence extent of the channel conditions. For example, when a violent channel condition change occurs relatively frequently, the preset interval is set to be relatively small; otherwise, the preset interval is set to be relatively large. Specific setting may be based on a requirement on signal transmission quality or the like, which is not used herein as a limitation to this technical solution.

Figure 4B:
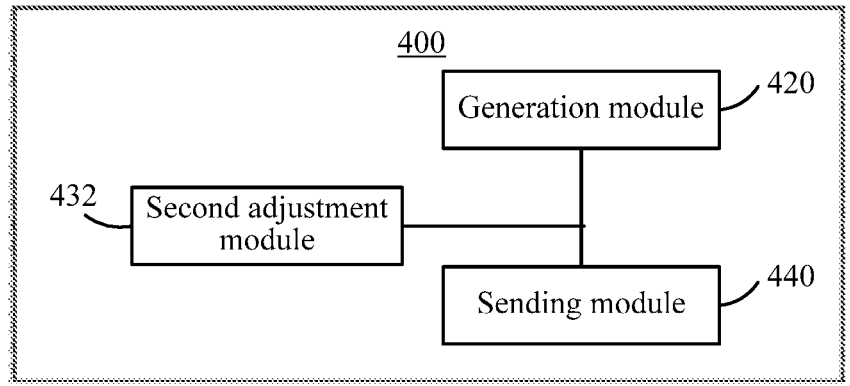
Figure 4C:
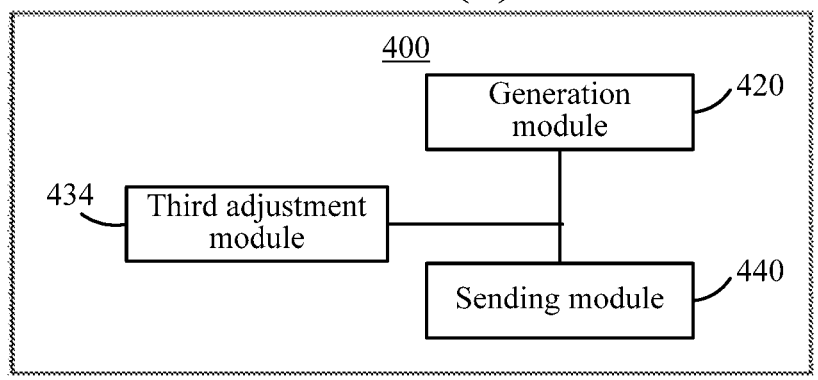

In a possible implementation manner, a channel condition change extent may be determined by using a signal from the transmit end device. In such implementation manner, as shown in FIG. 4(*b*), the apparatus 400 of this embodiment further comprises:

a second adjustment module 432, configured to adjust the preset interval at least according to at least one received parameter of the uplink signal received on the channel.

For example, a received signal-to-noise ratio of the uplink signal is obtained according to measurement on the received uplink signal, and compared with a signal-to-noise ratio obtained by means of historical (for example, previous) measurement. If the signal-to-noise ratio is reduced by more than a threshold, it means that the channel condition severely deteriorates, and the preset interval may be reduced; otherwise, the preset interval may not be adjusted or increased.

Still as described with reference to FIG. 3(*a*) to FIG. 3(*f*), a change in a relative location between the transmit end device and the receive end device also causes the channel to change, that is, corresponds to different channel quality in which a relatively large change may occur. Therefore, in another possible implementation manner, the preset interval may be adjusted based on a change in a relative location between the transmit end device and a receive end device. In such implementation manner, the apparatus of this embodiment further comprises:

a third adjustment module 434, configured to adjust the preset interval at least according to a change in a relative location between the transmit end device and a receive end device.

A change in a relative location between the transmit end device and the receive end device also causes the channel to change, that is, corresponds to different channel quality in which a relatively large change may occur. A change in a motion state of the transmit end device and/or the receive end device causes the relative location to change. Therefore, it may be determined or predicted, according to the motion state of the transmit end device and/or the receive end device, that a channel change frequently occurs, and the preset interval may be set to be relatively small; otherwise, the preset interval may not be adjusted or the preset interval may be set to be relatively large. Herein, the motion state comprises a current motion speed and/or a predicted motion trend, or the like of the transmit end device and/or the receive end device. In the apparatus of this embodiment, the motion state of the transmit end device and/or the receive end device is information that the receive end device can acquire. For example, the receive end device communications with the transmit end device to acquire the motion state of the transmit end device, and the receive end device can measure the motion state of the receive end device, and the like.

To sum up, the apparatus of this embodiment helps the transmit end device implement precise power control, and helps the transmit end device save power consumption.

Figure 5:
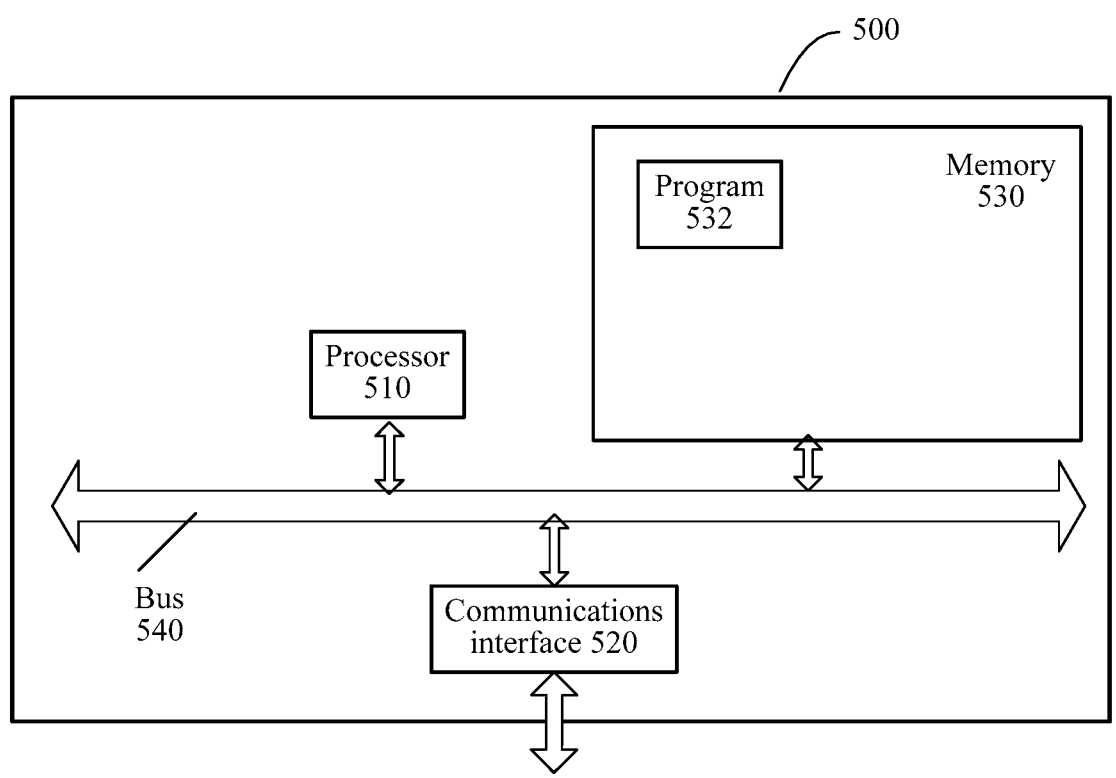
FIG. 5 is another exemplary structural block diagram of a power control apparatus of an embodiment of this application.

FIG. 5 is another exemplary schematic structural diagram of a power control apparatus of an embodiment of this application. Specific embodiments of this application do not limit specific implementation of the power control apparatus. As shown in FIG. 5, the power control apparatus 500 may comprise:

a processor 510, a communications interface 520, a memory 530, and a communication bus 540.

The processor 510, the communications interface 520, and the memory 530 communicate with each other through the communication bus 540.

The communications interface 520 is configured to communicate with a network element such as a client.

The processor 510 is configured to execute a program 532, and may specifically execute related steps in the method embodiment.

Specifically, the program 532 may comprise program code, wherein the program code comprises a computer operation instruction.

The processor 510 may be a central processing unit CPU, or an application specific integrated circuit ASIC (Application Specific Integrated Circuit), or one or more integrated circuits that are configured to implement the embodiment of this application.

The memory 530 is configured to store the program 532. The memory 530 may comprise a high-speed RAM memory, and may further comprise a non-volatile memory, for example, at least one disk memory. The program 532 specifically may be configured to enable the power control apparatus 500 to perform the following steps:

receiving, during transmission of an uplink signal of a first time domain transmission length on a channel, at least one piece of first information transmitted on the channel, wherein the first time domain transmission length does not exceed a time domain transmission length of a protocol data unit PDU; and adjusting uplink transmit power during the first time domain transmission length at least according to the at least one piece of first information.

For specific implementation of steps in the program 532, reference may be made to corresponding description of related steps and units in the foregoing embodiment, which is not described here. It may be clearly understood by a person skilled in the art that, for the purpose of convenient and brief description, for a detailed working process of the foregoing device and module, reference may be made to description about a corresponding process in the foregoing method embodiments, and details are not described herein again.

Figure 6:
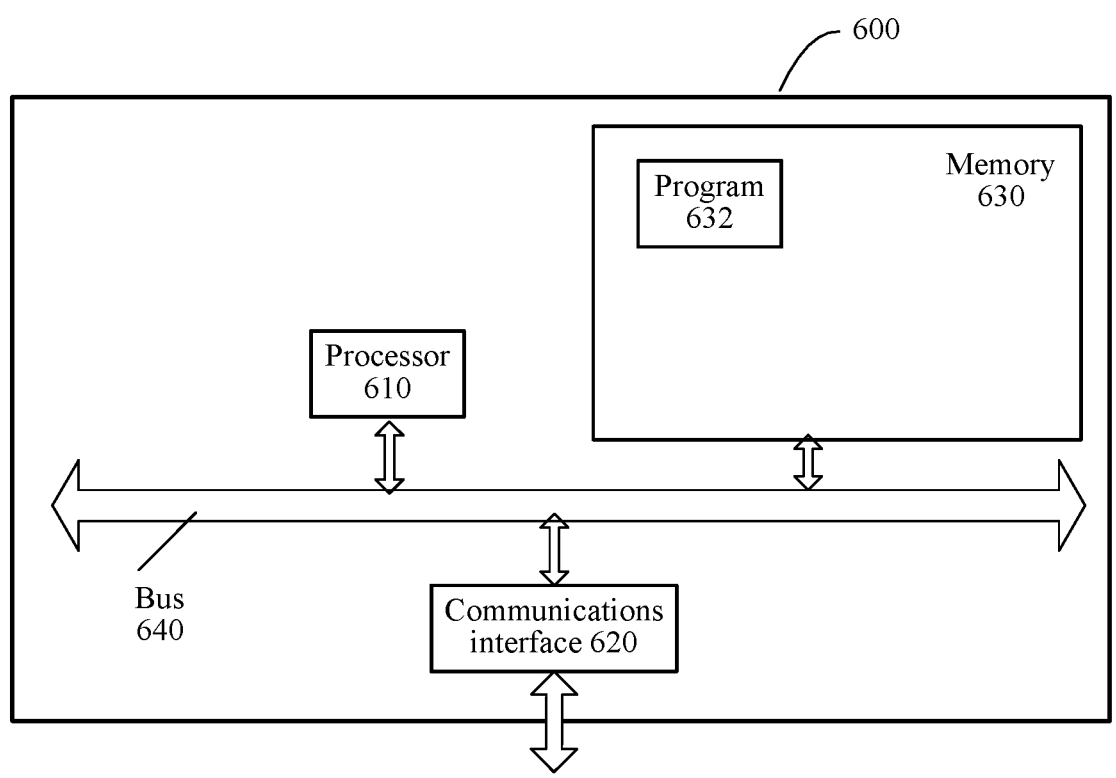
FIG. 6 is another exemplary structural block diagram of an auxiliary power control apparatus of an embodiment of this application.

FIG. 6 is another exemplary schematic structural diagram of an auxiliary power control apparatus of an embodiment of this application. Specific embodiments of this application do not limit specific implementation of the auxiliary power control apparatus. As shown in FIG. 6, the auxiliary power control apparatus 600 may comprise:

a processor 610, a communications interface 620, a memory 630, and a communication bus 640.

The processor 610, the communications interface 620, and the memory 630 communicate with each other through the communication bus 640.

The communications interface 620 is configured to communicate with a network element such as a client.

The processor 610 is configured to execute a program 632, and may specifically execute related steps in the method embodiment.

Specifically, the program 632 may comprise program code, wherein the program code comprises a computer operation instruction.

The processor 610 may be a central processing unit CPU, or an application specific integrated circuit ASIC (Application Specific Integrated Circuit), or one or more integrated circuits that are configured to implement the embodiment of this application.

The memory 630 is configured to store the program 632. The memory 630 may comprise a high-speed RAM memory, and may further comprise a non-volatile memory, for example, at least one disk memory. The program 632 specifically may be configured to enable the auxiliary power control apparatus 600 to perform the following steps:

generating at least one piece of first information; and sending, when a transmit end device transmits an uplink signal of a first time domain transmission length on a channel, the at least one piece of first information on the channel, wherein the at least one piece of first information is received by the transmit end device during the first time domain transmission length, and used by the transmit end device to adjust uplink transmit power during the first time domain transmission length at least according to the at least one piece of first information, and the first time domain transmission length does not exceed a time domain transmission length of a protocol data unit PDU.

For specific implementation of steps in the program 632, reference may be made to corresponding description of related steps and units in the foregoing embodiment, which is not described here. It may be clearly understood by a person skilled in the art that, for the purpose of convenient and brief description, for a detailed working process of the foregoing device and module, reference may be made to description about a corresponding process in the foregoing method embodiments, and details are not described herein again.

It may be clearly understood by a person skilled in the art that, for the purpose of convenient and brief description, for a detailed working process of the foregoing device and module, reference may be made to corresponding description in the foregoing apparatus embodiments, and details are not described herein again.

Although the present invention is described herein in the general context of program modules that execute in conjunction with an application program that runs on an operating system on a computer system, a person skilled in the art will recognize that the present invention may also be implemented in combination with other types of program modules. Generally, program modules comprise routines, programs, components, data structures and other types of structures that perform particular tasks or implement particular abstract data types. It can be understood by a person skilled in the art that the present invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or all or some of the technical solutions may be implemented in a form of a software product. The computer software product is stored in a storage medium and comprises several instructions for instructing a computer device (which may be a personal computer, a server, a network device, or the like) to perform all or some of the steps of the methods described in the embodiments of this application. The foregoing computer-readable storage medium comprises physically volatile and non-volatile media, and removable and non-removable media implemented by using any method or technology used for storing information such as a computer readable instruction, a data structure, a program module or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing implementation manners are merely intended for describing the present invention rather than limiting the present invention. A person of ordinary skill in the art should understand that modifications and variations may still be made without departing from the spirit and scope of the present invention. Therefore, all equivalent technical solutions shall fall within the scope of the present invention, and the patent protection scope of the present invention shall be subject to the claims.

What is claimed is:

1. A power control method, comprising:
receiving, during transmission of an uplink signal of a first time domain transmission length on a channel, at least one piece of first information transmitted on the channel, wherein the first time domain transmission length does not exceed a time domain transmission length of a protocol data unit, and the first information comprising a reference signal;
calculating a downlink path loss according to measured power of a received reference signal and transmit power of the reference signal;
comparing the downlink path loss with a historically-measured path loss;
if the downlink path loss is greater than the historically-measured path loss by more than a threshold, increasing a frequency with which an uplink transmit power is to be adjusted during the first time domain transmission length; and
adjusting the uplink transmit power with the increased frequency during the first time domain transmission length.

2. The method of claim 1, wherein the adjusting the uplink transmit power during the first time domain transmission length comprises:
adjusting, in response to that a piece of first information is received, the uplink transmit power.

3. The method of claim 1, wherein the first information comprises: a control command associated with the adjusting the uplink transmit power.

4. The method of claim 1, wherein the method further comprises:
determining, at least according to a change in a relative location between a transmit end device and a receive end device, time at which the adjusting the uplink transmit power is performed at least next time.

5. The method of claim 1, wherein the method further comprises:
determining, at least according to a change in a relative location between a transmit end device and a receive end device, time at which the receiving the first information transmitted on the channel is performed at least next time.

6. The method of claim 4, wherein the method further comprises:
determining, at least according to a motion state of the transmit end device, the change in the relative location between the transmit end device and the receive end device.

7. The method of claim 1, wherein the method further comprises determining a channel quality of the channel by:
determining at least one channel quality parameter at least according to the at least one piece of received first information; and
determining the channel quality of the channel at least according to the at least one channel quality parameter.

8. The method of claim 7, wherein the channel quality parameter is associated with one or more of the following parameters:
a path loss, a signal-to-noise ratio SNR, a carrier-to-noise ratio CNR, a signal-to-interference-plus-noise ratio SINR, a carrier-to-interference-plus-noise ratio CINR, a bit error rate BER, channel attenuation, a time delay, channel state information CSI, a channel transmission matrix and a channel quality indicator CQI.

9. An auxiliary power control method, comprising:
generating at least one piece of first information comprising a reference signal; and
sending, when a transmit end device transmits an uplink signal of a first time domain transmission length on a channel, the at least one piece of first information on the channel, wherein
the at least one piece of first information is received by the transmit end device during the first time domain transmission length, so that the transmit end device calculates a downlink path loss according to measured power of a received reference signal and transmit power of the reference signal, compares the downlink path loss with a historically-measured path loss, and increases, if the calculated path loss is greater than the historically-measured path loss by more than a threshold, a frequency with which an uplink transmit power is to be adjusted during the first time domain transmission length; and the at least one piece of first information is used by the transmit end device to adjust the uplink transmit power during the first time domain transmission length at least according to the at least one piece of first information, and the first time domain transmission length does not exceed a time domain transmission length of a protocol data unit.

10. The method of claim 9, wherein the first information comprises: a control command associated with the adjusting the uplink transmit power of the transmit end device.

11. The method of claim 10, wherein the generating at least one piece of first information comprises:
generating the at least one piece of first information at least according to at least one received parameter of the uplink signal received on the channel.

12. The method of claim 9, wherein the sending the at least one piece of first information on the channel further comprises:
sending the at least one piece of first information at a preset interval.

13. The method of claim 12, wherein the method further comprises:
adjusting the preset interval at least according to at least one received parameter of the uplink signal received on the channel.

14. The method of claim 12, wherein the method further comprises:
adjusting the preset interval at least according to a change in a relative location between the transmit end device and a receive end device.

15. The method of claim 11, wherein the at least one received parameter comprises: received signal power, and a received signal-to-noise ratio.

16. A power control apparatus, wherein the apparatus comprises:
a transceiver;
a memory, configured to store an instruction; and
a processor, configured to execute the instruction stored in the memory, wherein the instruction enables the processor to perform:
receiving, during transmission of an uplink signal of a first time domain transmission length on a channel, at least one piece of first information transmitted on the channel, wherein the first time domain transmission length does not exceed a time domain transmission length of a protocol data unit, the first information comprising a reference signal;

calculating a downlink path loss according to measured power of a received reference signal and transmit power of the reference signal;

comparing the downlink path loss with a historically-measured path loss;

if the calculated path loss is greater than the historically-measured path loss by more than a threshold, increasing a frequency with which an uplink transmit power is to be adjusted during the first time domain transmission length; and adjusting the uplink transmit power with the increased frequency during the first time domain transmission length.

17. The apparatus of claim 16, wherein the instruction enables the processor to further perform: adjusting, in response to that a piece of first information is received, the uplink transmit power.

18. The apparatus of claim 16, wherein the instruction enables the processor to further perform:

determining, at least according to a change in a relative location between a transmit end device and a receive end device, time at which adjusting the uplink transmit power is performed at least next time.

19. The apparatus of claim 16, wherein the instruction enables the processor to further perform:

determining, at least according to a change in a relative location between a transmit end device and a receive end device, time at which the receiving the first information transmitted on the channel is performed at least next time.

20. An auxiliary power control apparatus, wherein the apparatus comprises:

a transceiver;

a memory, configured to store an instruction; and a processor, configured to execute the instruction stored in the memory, wherein the instruction enables the processor to perform:

generating at least one piece of first information; and sending, when a transmit end device transmits an uplink signal of a first time domain transmission length on a channel, the at least one piece of first information on the channel, wherein the at least one piece of first information is received by the transmit end device during the first time domain transmission length, so that the transmit end device calculates a downlink path loss according to measured power of a received reference signal and transmit power of the reference signal, compares the downlink path loss with a path loss historically measured, and increases, if the calculated path loss is greater than the historically measured path loss by more than a threshold, a frequency with which an uplink transmit power is to be adjusted during the first time domain transmission length; and the at least one piece of first information is used by the transmit end device to adjust the uplink transmit power during the first time domain transmission length at least according to the at least one piece of first information, and the first time domain transmission length does not exceed a time domain transmission length of a protocol data unit.

21. The apparatus of claim 20, wherein the instruction enables the processor to further perform: generating the at least one piece of first information at least according to at least one received parameter of the uplink signal received on the channel.

22. The apparatus of claim 20, wherein the instruction enables the processor to further perform: sending the at least one piece of first information at a preset interval.

23. The apparatus of claim 22, wherein the instruction enables the processor to further perform:

adjusting the preset interval at least according to at least one received parameter of the uplink signal received on the channel.

24. The apparatus of claim 22, wherein the instruction enables the processor to further perform:

adjusting the preset interval at least according to a change in a relative location between the transmit end device and a receive end device.

* * * * *